INVENTOR
OLOF BRYNGDAHL

ATTORNEY

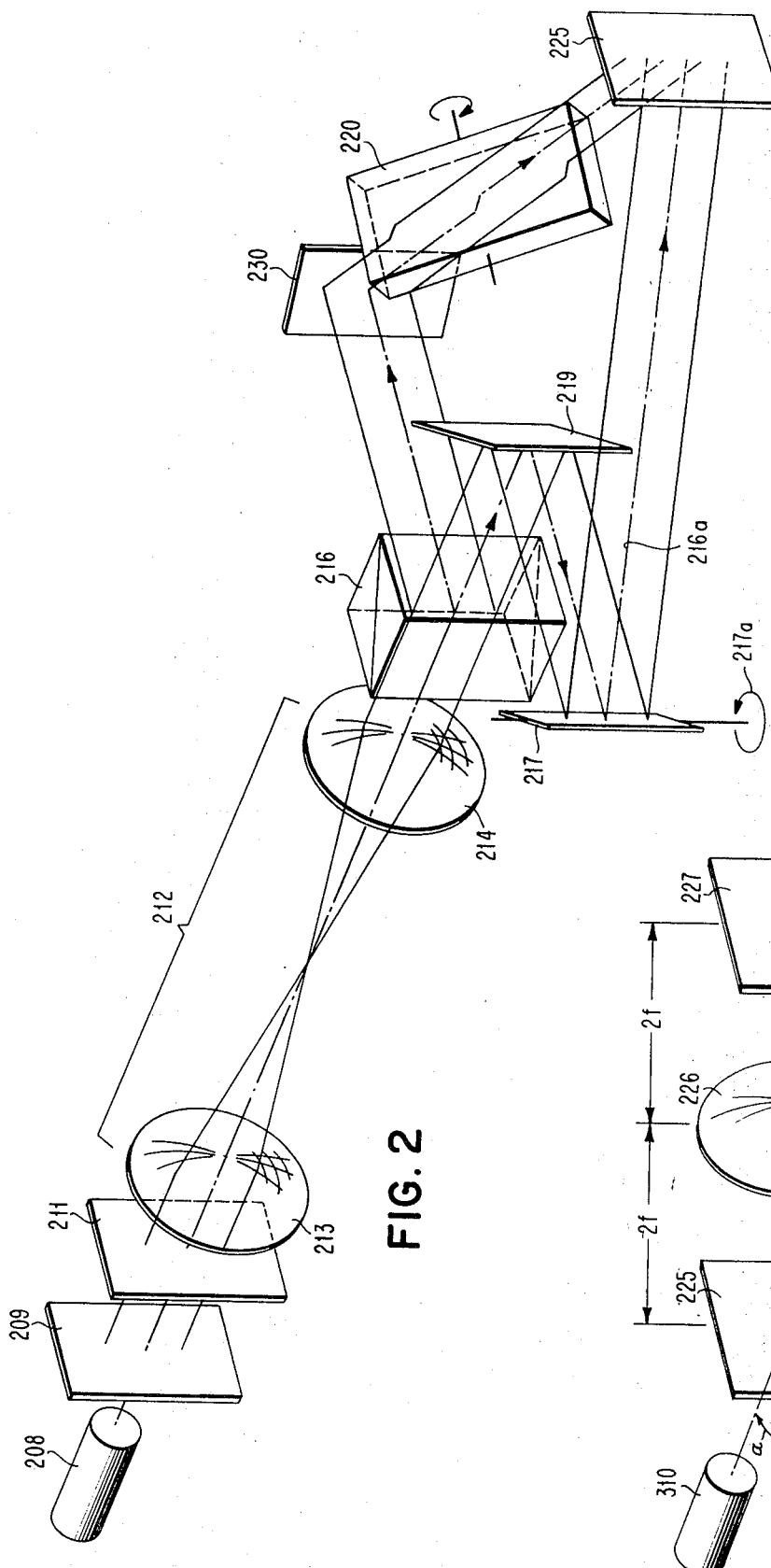
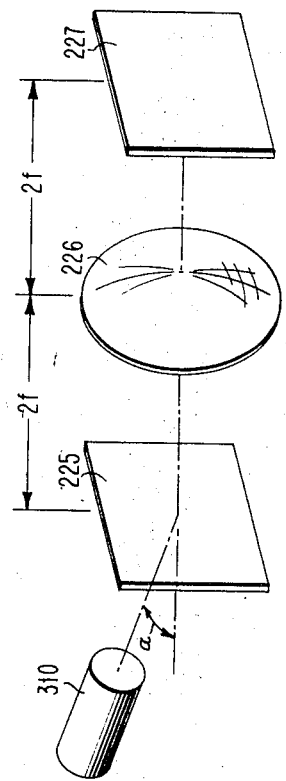
FIG. 2
FIG. 3

United States Patent Office 3,532,431
Patented Oct. 6, 1970

3,532,431
SHEARING INTERFEROMETRY BY MEANS OF HOLOGRAPHY
Olof Bryngdahl, Los Gatos, Calif., assignor to International Business Machines Corporation, Armonk, N.Y., a corporation of New York
Filed Feb. 5, 1968, Ser. No. 702,879
Int. Cl. G01b 9/02; G02b
U.S. Cl. 356—106
6 Claims

ABSTRACT OF THE DISCLOSURE

Image holograms are recorded on a photographic film and, later, the developed film is used to generate a fringe pattern. The photographic film is exposed twice. During the first exposure, two beams, each of which carry an image of the object, are interacted to generate a hologram on the photographic film. Both of the beams generate one image of the object on the recording medium; however, there is a shear between the two images. During the second exposure of the recording medium, two beams, each of which merely contain plane waves, are interacted to form a hologram on the photographic medium. After the two exposures, the recording medium is developed, and it is used to reconstruct two sheared images of the object. The images of the object so reconstructed have interference fringes superimposed thereon in their common area.

BACKGROUND OF THE INVENTION

Field of the invention

The present invention relates to interferometry, and more particularly, to methods and apparatus for obtaining shearing interferograms by means of double exposure holography.

Description of the prior art

It is known that holographic photography can be utilized to create interferograms. Using holographic techniques, one can record the wavefront created by an object and, at a later time, using the recording (the hologram), one can reconstruct a wavefront which is exactly the same as the wavefront which was originally created by the object. Since the wavefront from a hologram is an exact duplicate of the original wavefront from the object which was used to record the hologram, the wavefront from a hologram can be used in exactly the same manner as the wavefront from an object to create interference patterns. Among other places, this is discussed in an article entitled "An Application of Wavefront Reconstruction to Interferometry" by Melvin H. Horman, published in Applied Optics, March 1965, vol. 4, No. 3, p. 333, and "Interferometric Hologram Evaluation and Real Time Vibration Analysis of Diffused Objects" by Carl A. Stetson and Robert L. Powell, published in the Journal of the Optical Society of America, vol. 55, 1965, p. 1694.

In the techniques described in the above references, holographic photography is used to reconstruct a wavefront which is identical to the wavefront which originally came from an object. The reconstructed wavefront is then either interacted with a reference wavefront, or with a wavefront from the object itself to create interference patterns.

Another technique for using holographic photography to create interference patterns is known as "double exposure holography." In double exposure holography, the same recording material is subjected to two exposures. In general, during the first exposure, information about an object is recorded. During the second exposure, comparison information is recorded. After the photographic material is developed, and used to reconstruct wavefronts, both the wavefront from the object and the reference wavefront are simultaneously reconstructed and interference between the wavefronts takes place. This type of interferometry is discussed in an article entitled "Holographic Interferometry" by L. O. Heflinger et al., published in the Journal of Applied Physics, vol. 37, No. 2, February, 1966, p. 642.

SUMMARY OF THE INVENTION

The object of the present invention is to provide an improved method and apparatus for shearing interferometry.

Another object of the present invention is to provide an improved method and apparatus for creating shearing interferograms of transient phenomena.

Still another object of the present invention is to provide method and apparatus for creating an interferogram using double exposure holography wherein object information is only present during the first recording step.

The above objects are achieved by utilizing a holographic recording technique. Holograms are recorded on a photographic film and, later, the developed film is used to generate a fringe pattern. The photographic film is exposed twice. During the first exposure, two beams, each of which carry an image of the object, are interacted to generate a hologram on the photographic film. Both of the beams generate one image of the object on the recording medium; however, there is a shear between the two images. During the second exposure of the recording medium, two beams, each of which merely contain plane waves, are interacted to form a hologram on the photographic medium. After the two exposures, if photographic film which requires development is used, the recording medium is developed, and then it is used to reconstruct two sheared images of the object. The images of the object so reconstructed have interference fringes superimposed thereon in their common area.

The foregoing and other objects, features and advantages of the invention will be apparent from the following more particular description of preferred embodiments of the invention, as illustrated in the accompanying drawings.

BRIEF DESCRIPTION OF THE DRAWINGS

FIG. 2 is a first embodiment of the present invention which creates lateral shearing interferograms.

FIG. 3 is an embodiment of apparatus used during the reconstruction step of the present invention.

DESCRIPTION OF THE PREFERRED EMBODIMENTS

Figure 1A:
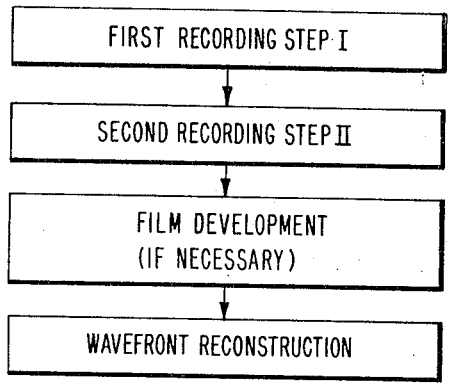
FIGS. 1A, 1B, 1C and 1D are diagrammatic representations of the method and apparatus of the present invention.

The four basic steps involved in practicing the present invention are shown diagrammatically in FIG. 1A. There are two recording, or exposure, steps. Next, the film is developed. The final step involves the reconstruction of wavefronts which interfere to form the desired fringe pattern.

Figure 1B:
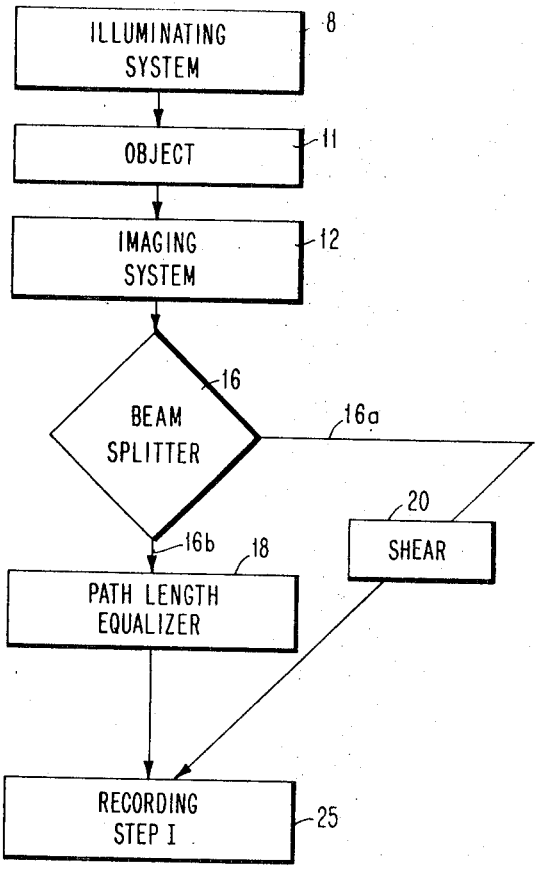
Figure 1C:
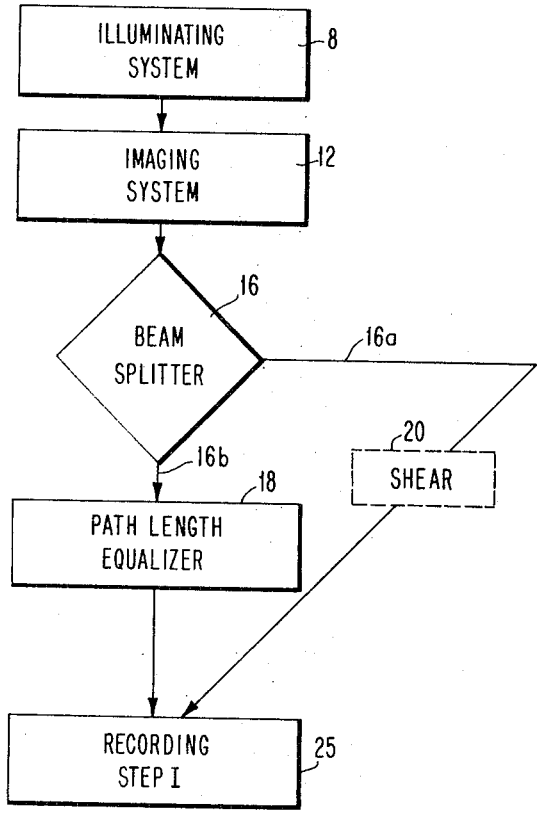
Figure 1D:
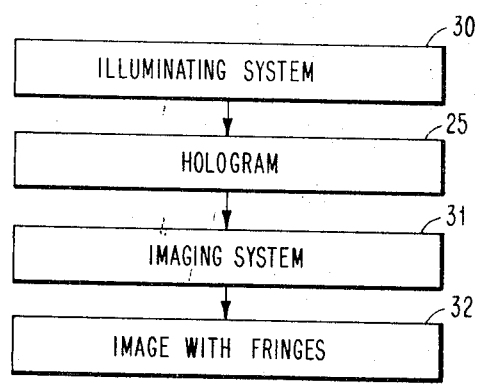

FIG. 1B illustrates the principles involved in the first recording step; FIG. 1C illustrates the principles involved in the second recording step; and FIG. 1D represents the reconstruction process. The optical system used during both of the recording steps shown in FIGS. 1B and 1C includes an illuminating system 8, a telescopic imaging system 12, a beam splitter 16, a path equalizing device 18, a shearing device 20, and a photographic recording medium 25.

The light from illuminating system 8 travels on two paths from illuminating system 8 to recording medium 25. Path length equalizer 18 insures that the path lengths are equal. Path length equalizer 18 is needed so that the images created by the light travelling on both paths 16a and 16b will be focussed on recording medium 25. Shearing device 20 introduces a lateral shear into the light travelling along path 16a. Hence, the image created by the light travelling along path 16b is slightly shifted relative to the image created by the light travelling on path 16a.

During the first recording step, object 11 is in the system as shown in FIG. 1B. The light in beams 16a and 16b form two images of object 11 on recording medium 25. These images are slightly shifted due to the action of shearing device 20. Beams 16a and 16b interfere to form a hologram which is recorded on photographic plate 25.

The second recording step is illustrated in FIG. 1C. The apparatus in FIG. 1C is identical to the apparatus in FIG. 1B with the exception that the object 11 has been removed. Thus, during the second recording step, the light travelling along paths 16a and 16b is in the form of plane waves. Shearing device 20 is shown in dotted lines since shearing a plane wave produces no relevant effect. During the second recording step, the plane waves in beams 16a and 16b interfere and form a hologram which is recorded on photographic recording medium 25. After the two recording steps illustrated in FIGS. 1B and 1C, the photographic recording medium 25 is developed in a conventional manner.

The actual interference fringes are produced in exactly the same manner that an image is produced using a conventional hologram; namely, coherent light is passed through the hologram to form an image. The reconstructed image has interference fringes superimposed thereon which represent the optical phase difference between an image of the object and an image of the object slightly shifted.

FIG. 1D represents the principles of the reconstruction step. An imaging system is needed which is similar to the imaging system used during the recording step.

FIG. 2 represents a first embodiment of apparatus for practicing the recording steps of the present invention. This apparatus includes an illuminating system 208 giving coherent light, a shutter 209, a telescopic imaging system 212, a beam splitter 216, a plate 220 for laterally shifting the light travelling along path 216b, two mirrors 217, 219 to equalize path lengths 216a and 216b, a photographic plate 225, and a mirror 230 which directs the light along path 216b.

The same apparatus is used during both recording steps. During the first recording step, an object 211 is included in the system and both the light travelling along path 216a and the light travelling along path 216b contain object information. The lenses 213 and 214 in imaging system 212, and the length of paths 216a and 216b are arranged so that the light travelling on each path creates an image of object 211 on photographic plate 225; however, the image created by the light travelling along path 216b has a slight lateral shift relative to the image created by the light travelling along path 216a. After the photographic plate 225 is exposed with object 211 in place, object 211 is removed and the photographic plate 225 is again exposed. Details concerning the length of exposure are given later.

After the second exposure, the photographic plate 225 is developed. The plate is then illuminated with coherent light and an image of the object is created. Superimposed on this image are interference fringes.

FIG. 3 represents the apparatus for viewing the hologram created by the apparatus shown in FIG. 2. This apparatus includes a light source 310, which provides coherent columated light, a lens 226, and a screen 227. The light from source 310 is directed at the developed photographic plate 225. The light source 310 is placed off-axis by an angle α. The angle α is equal to the angle between the two beams 216a and 216b used in the recording process. After passing through photographic plate 225, the light goes through a lens 226 which forms an image of object 11 in plane 227. The image of object 11 which appears in plane 227 has interference fringes superimposed thereon. It is noted that the apparatus shown in FIG. 3 is similar to conventional apparatus used to reconstruct image holograms.

The light source 209 must be a coherent light source, such as a laser. The beams emanating from the light sources must consist of parallel coherent light and the size of the beam must be large enough to illuminate the entire object which is being photographed. A stop to exclude spurious light would normally be included in the system; however it is not specifically shown herein since the use of such apparatus is conventional. Likewise, no mechanism for operating shutter 209 is explicitly shown since such mechanism is conventional. Shutter 209 is opened for a short period of time during each recording step. For example, if photographic material such as that produced under the trade mark Kodak 649F plates are used, and a 10mW He-Ne laser beam is expanded to a diameter of one inch, then the shutter would be open for about one second during each recording step. The light sources could be commercially available lasers. The plate 220 could consist of clear glass ⅜ of an inch thick. If inclined at 46° relative to the optical axis of path 216b, the image would be shifted about 0.04 inch.

It is noted that herein the invention is described in an embodiment that uses silver halide film. Other types of recording materials, such as thermoplastic or photocromics, could also be used. These other films might not necessitate a development step. Furthermore, as shown herein, the image is generated using the film which was actually exposed. The exposed film could be reproduced and the reproduction used to generate the image.

The distances between the various elements, and the focal power of lenses 213 and 214, are chosen so that path length 216a equals path length 216b, and so that an image of object 211 appears on photographic film 225. The conventional lens equation gives the relationship which must be satisfied. The angular separation α of the beams 216a and 216b is the same as in conventional holography. For example, it could be 20°.

Mirror 217 is rotatable in the direction of arrow 217a so that a tilt can be introduced into one of the reconstructed wavefronts. This is a conventional technique which allows one to obtain an array of fringes which can be easily used for measurement purposes. The amount of rotation should be much less than the angle α. For example, as shown herein, α is 20° and mirror 217 is rotated one tenth of a degree.

In instances where one would like to obtain fringes, each of which represent specific amounts of phase differences between positions on the object, one would not rotate mirror 217 between exposures. By rotating mirror 217 between exposures, one obtains fringe variations which represent variations in the phase of the object at that point.

Figures 4A, 4B, 5:
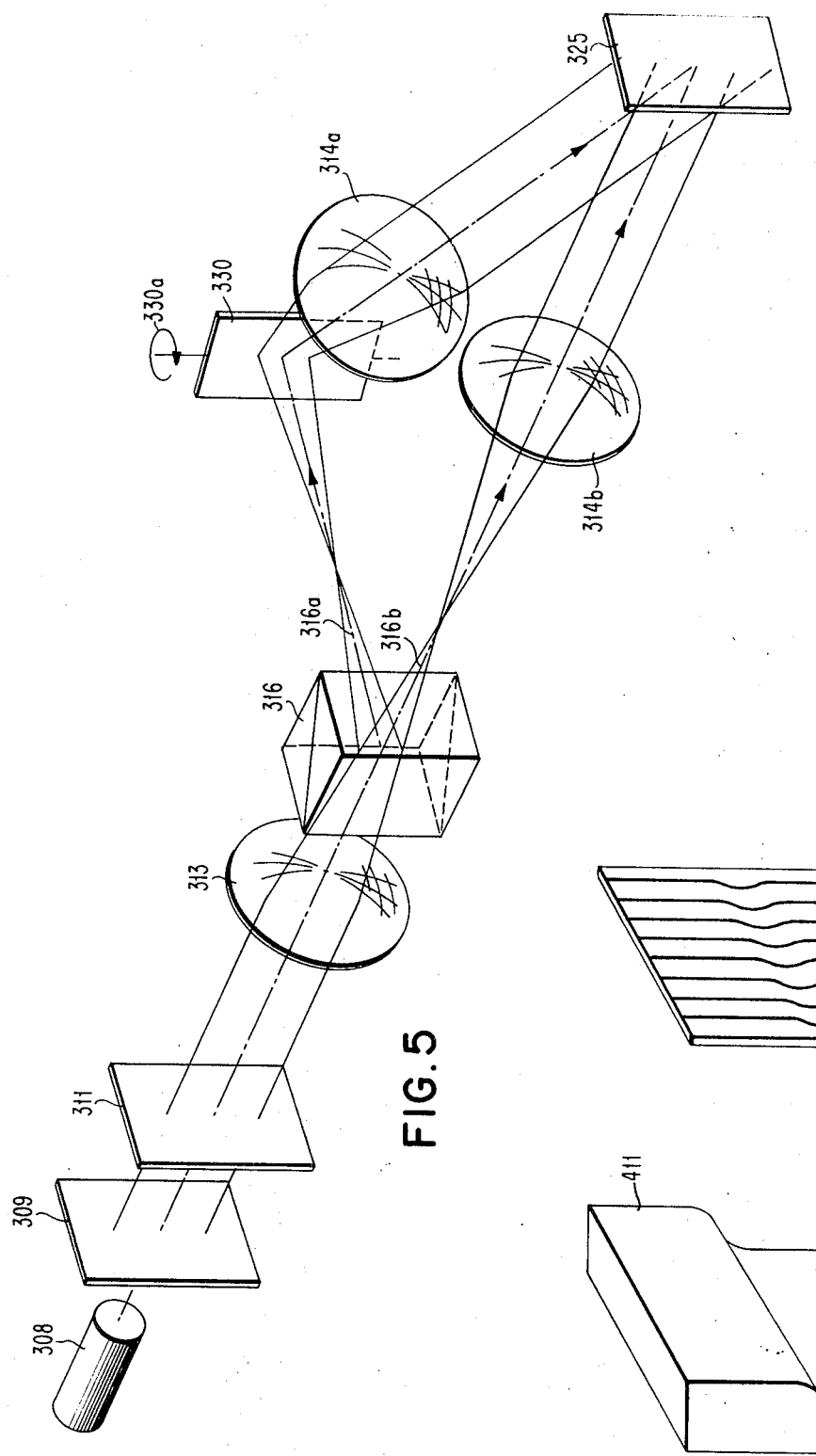
FIGS. 4A and 4B show a sample object and the resulting fringe patterns.
FIG. 5 is a second embodiment of the present invention which creates radial sheared interferograms.

FIG. 4A shows an example of an object 411 and FIG. 4B shows the fringe patterns generated using the present invention. Object 411 is a completely transparent object, but it is thicker on one end. Thus, it only affects the phase of the light.

It is noted that the present invention can be used with both amplitude (transmission) and/or phase objects. Furthermore, the invention can be used where the light entering the system is reflected from the object, rather than transmitted through the object.

Since the object 211 only needs be in the system during the first recording step, it is entirely possible to use an object 211 which consists of a transient phenomenon, such as the shockwaves created by a speeding bullet, or the change in refractive index caused by stress within a material. The shutter in the system would be opened while the transient phenomenon occurs in order to perform the first recording step. Thereafter, without the presence of the transient phenomenon, the second recording step would be performed. With the present invention, holographic shearing interferometry of transient phenomenon is possible because the object information is in both beams which form the hologram during the first recording step.

Herein, the same apparatus is used during both recording steps; however, this is not essential to the invention. The only requirement is that the angular separation $\alpha$ between the beams must be substantially the same in each step, and the angle between the beams and the recording material must be substantially the same during each step.

The action of the system can be mathematically described by the following:

The intensity recorded on the recording element 225 is given by:

(intensity due to two object waves) + (intensity due to two plane waves)

or $$|e^{i\phi}1 + e^{i(\phi_2 + \alpha x)}|^2 + |1 + e^{i\alpha x}|^2 = I \qquad (1)$$

In reconstruction, this hologram is illuminated with a plane wave $e^{i\alpha x}$ and the amplitude of one of the reconstructed images is $e^{i(\phi_1 - \phi_2) + 1}$.

The interferogram will have the following intensity distribution $$I = |e^{i(\phi_1 - \phi_2) + 1}|^2 \qquad (2)$$

Equations 1 and 2 may be written $$I = |e^{(i\phi_1 - \phi_2)} + 1|^2 = \cos^2 \frac{(\phi_1 - \phi_2)}{2} \qquad (3)$$

from which it is seen that destructive interference occurs for $\phi_1 - \phi_2 = (2n+1)\pi$, where $n$ is an integer.

The phase difference $\phi_1 - \phi_2$ is, of course, dependent on the phase $\phi$ over the object as well as on the type of shearing. The phase difference in Equation 3 will take the following form for different types of shear:

$\phi(x, y) - \phi(x, y + \Delta y)$ _____ Lateral shear $\Delta y$
$\phi(x, y) - \phi(-x, y)$ _____ Reversion or folded shear
$\phi(r, \theta) - \phi(r, \theta + \Delta \theta)$ _____ Rotation shear $\Delta \theta$
$\phi(r, \theta) - \phi(mr, \theta)$ _____ Radial shear with a ratio $m$
$\phi(x, y, z) - \phi(x, y, z + \Delta z)$ __ Longitudinal shear $\Delta z$.

As previously explained, for measuring purposes, it is often desirable to introduce a reference fringe system. This is done by tilting one of the sheared wavefronts in respect to the other. This tilt is produced by a slight rotation of the mirror 217 between the two exposures. This may be represented by a term $e^{i(\alpha + \delta)x}$ instead of $e^{i\alpha x}$ in the last exposure ($\delta \ll \alpha$). Then, Equation 2 becomes $$I = |e^{i(\phi_1 - \phi_2 + \delta x)} + 1|^2$$

and the interference fringes are represented by $$\delta x = -(\phi_1 - \phi_2) + (2n+1)\pi$$

A second embodiment of the invention is shown in FIG. 5. The difference between the embodiment shown in FIG. 5 and the embodiment shown in FIG. 2 is that the embodiment shown in FIG. 5 is particularly adapted to accomplish radial shearing. Radial shearing involves a radial magnification of one of the images relative to the other image. In principle, the embodiment shown in FIG. 5 operates identical to the embodiment shown in FIG. 2 with the exception that the imaging system shown as element 212 in FIG. 2 here is divided into two parts. The first part is lens 313 and the second part consists of lenses 314a and 314b. Lenses 313 and 314a generate an image on photographic recording medium 225 having one magnification, and lenses 313 and 314b generate an image on recording medium 225 which has a different magnification.

It is noted that no path length equalization is necessary since different distance relationships must be established in paths 316a and 316b. The essence of the distance relationships is that the focal power of lenses 313 and 314b and the distances in path 316b are arranged to form an image of object 311 on recording medium 225 and lenses 313 and 314a, and the distance in path 316a, are selected so that the light travelling along path 316a also forms an image of object 311 on recording medium 225.

It is also noted that in this second embodiment the number of reflections occurring in the light travelling along paths 316a and 316b have an even number relationship; namely, there are no reflections of the light travelling along path 316a and there are two reflections of the light travelling along path 316b. This is necessary in order to insure that the images which are created on recording medium 225 are properly oriented. In the first embodiment, each path included two reflections.

The second embodiment is used in exactly the same manner as the first embodiment. Namely, the photographic film 325 is exposed twice—once with the object in the system, and once without the object. The film is then developed and used to reconstruct an image of the hologram. This image will have fringes superimposed thereon. A system similar to that shown in FIG. 3 can be used for the reconstruction step. It is noted that in the system shown in FIG. 3, the only requirement of note is that lens 226 forms an image of hologram 225 on screen 227. For example, both the distance between object 225 and lens 226 and the distance between lens 226 and screen 227 could be two times the focal length of lens 226.

As described above, the two exposures of the recording medium are separated by a period of time. The same results could be obtained by separating the exposures in some other manner. The only requirement is that the light which constitutes, or forms, the first exposure must be prevented from interacting, that is, interfering, with the light which constitutes, or forms, the second exposure. Naturally, if the two exposures are separated by time, the above is accomplished. Alternate techniques of separating the exposures are possible. For example, the two exposures could occur simultaneously if the light, which constitutes, or forms, the first exposure, is polarized in one direction, while the light, which constitutes, or forms, the second exposure, is polarized in an orthogonal direction. Thus, the two exposures could take place simultaneously if optical elements are provided which (1) polarize the light passing through the object in a first direction, and (2) simultaneously directs, or sends, to recording medium 225 two plane waves which are separated by an angle $\alpha$, the light in said plane waves being polarized in a direction that is orthogonal to said first direction.

Other types of shearing in addition to the two types specifically shown herein could be accomplished by use of appropriate optical systems which focus the two images on the recording medium with the desired type of shear.

While the invention has been particularly shown and described with reference to preferred embodiments thereof, it will be understood by those skilled in the art that various changes in the form and details may be made therein without departing from the spirit and scope of the invention.

What is claimed is:

1. A method of generating interference fringes representing variations in the phase characteristics of an object comprising the steps of:
    (A) exposing a photographic plate to a hologram of said object, wherein two angularly separated wave trains, each of which carry object information, are interacted to form said hologram, and wherein said wave trains are sheared relative to each other;
    (B) exposing said photographic plate to a hologram generated by two plane waves which have an angular relationship similar to the angular separation of the wave trains carrying object information in the preceding step;

(C) illuminating said hologram with coherent light to generate an image of said object, said image appearing with interference fringes superimposed thereon.

2. The method of shearing interferometry comprising:
exposing a photographic medium to a hologram generated by two images of an object which have been sheared;
exposing said photographic medium to a hologram generated by two plane waves;
illuminating said photographic medium to generate an image of the recorded information whereby an image of said object having interference fringes superimposed thereon is generated.

3. The method recited in claim 2 wherein lateral shear is introduced between said object.

4. The method recited in claim 2 wherein radial shear is introduced between said object.

5. The method recited in claim 2 wherein both of said holograms are made by identical apparatus.

6. The method recited in claim 2 including the step of developing said photographic medium following the second exposure.

References Cited

UNITED STATES PATENTS 3,345,912   10/1967   Lohmann _____ 356—110 X

OTHER REFERENCES

"The Use of a Single Plane Parallel Plate as a Lateral Shearing Interferometer With a Visible Gas Laser Source," M. V. R. K. Murty, Applied Optics, April 1964, vol. 3, No. 4.

"Hologram Interferometry," Karl A. Stetson and Robert L. Powell, Oct. 6, 1965.

RONALD L. WIBERT, Primary Examiner

C. CLARK, Assistant Examiner

U.S. Cl. X.R.

350—3.5